United States Patent
Watson

[19]

[11] Patent Number: 6,091,805
[45] Date of Patent: *Jul. 18, 2000

[54] COMPUTERIZED VOICE RESPONSE SYSTEM

[75] Inventor: Gary E. Watson, Dayton, Ohio

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/498,559

[22] Filed: Jul. 5, 1995

[51] Int. Cl.[7] .................................................. H04M 11/00
[52] U.S. Cl. .................................... 379/93.17; 379/93.26; 379/88.13
[58] Field of Search .................................. 379/96, 93, 94, 379/97, 98, 88, 89, 91, 93.17, 93.19, 93.25, 93.26, 93.28, 93.01, 93.05, 93.09, 93.12, 93.13, 93.08, 93.31, 88.13, 88.18

[56] References Cited

U.S. PATENT DOCUMENTS

| | | | |
|---|---|---|---|
| 4,071,698 | 1/1978 | Barger, Jr. et al. | 179/2 R |
| 4,581,484 | 4/1986 | Bending | 179/2 DP |
| 4,785,408 | 11/1988 | Britton et al. | 364/513.5 |
| 4,864,600 | 9/1989 | Fernandez | 379/96 |
| 5,001,745 | 3/1991 | Pollock | 379/96 |
| 5,218,633 | 6/1993 | Clagett et al. | 379/144 |
| 5,231,571 | 7/1993 | D'Agostino | 364/408 |
| 5,267,148 | 11/1993 | Kosaka et al. | 364/408 |
| 5,325,427 | 6/1994 | Dighe | 379/386 |
| 5,345,501 | 9/1994 | Shelton | 379/89 |
| 5,485,370 | 1/1996 | Moss et al. | 379/93 |
| 5,561,709 | 10/1996 | Remillard | 379/96 |
| 5,572,572 | 11/1996 | Kawan et al. | 379/98 |
| 5,583,922 | 12/1996 | Davis et al. | 379/93.17 |
| 5,592,538 | 1/1997 | Kosowsky et al. | 379/93 |
| 5,615,257 | 3/1997 | Pezzullo et al. | 379/96 |

OTHER PUBLICATIONS

Newton's Telecom Dictionary, 8th edition, ADSI definition, Nov. 1994.

*Primary Examiner*—Stella Woo
*Attorney, Agent, or Firm*—Charlene Stukenborg

[57] ABSTRACT

In accordance with the teachings of the present invention, a voice response system with visual menus along with audio menus is provided. The system includes a voice response host computer, a touch tone phone, a personal computer with a display screen and a communications interface for converting DTMF signals or other tones to digital signals. The personel computer has a program to display visual menus on the screen. The user interface of the voice response system provides both audio and visual menu listings.

20 Claims, 11 Drawing Sheets

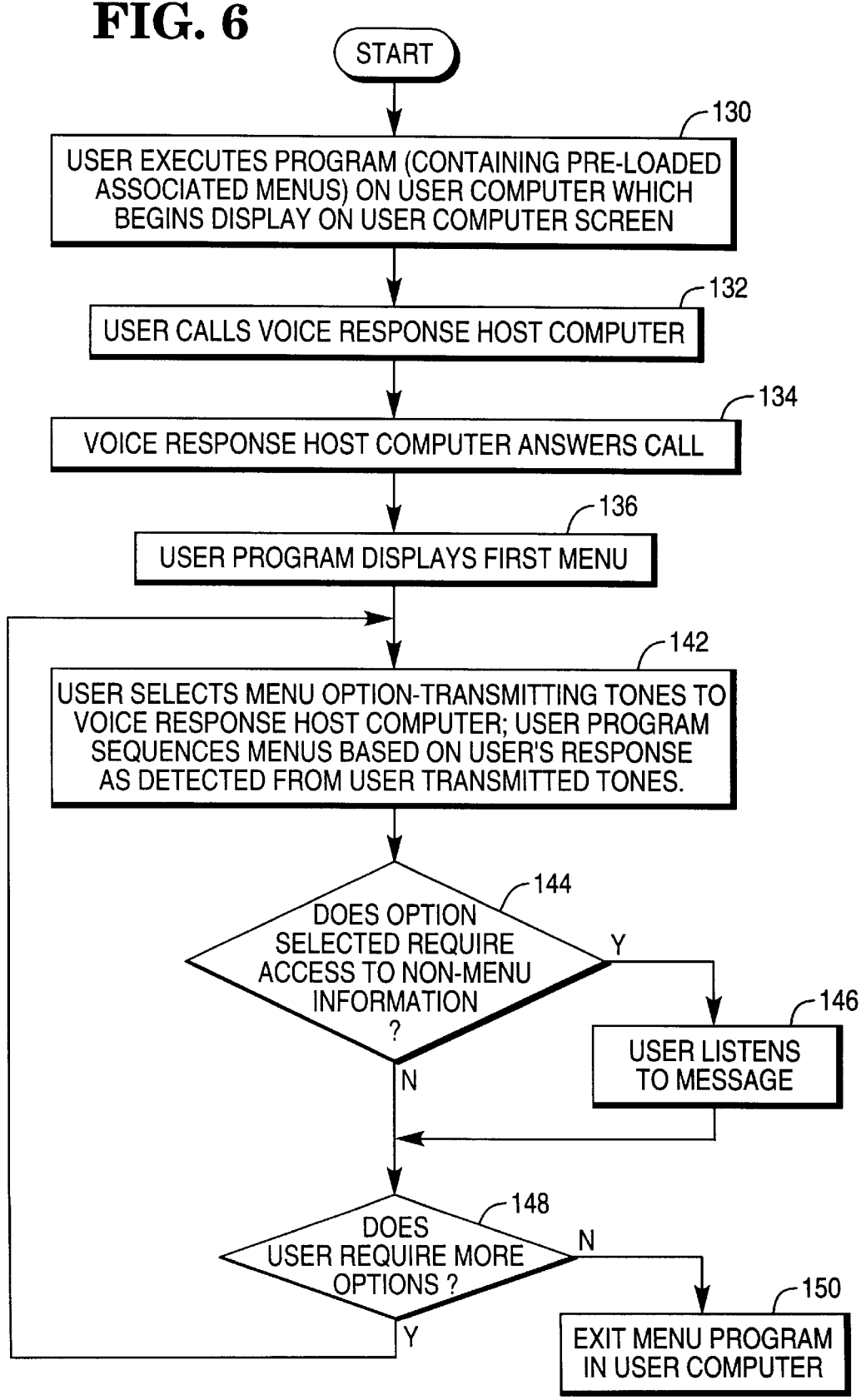

COMPUTERIZED VOICE RESPONSE SYSTEM

BACKGROUND OF THE INVENTION

The present invention relates to a computerized voice response system, particularly the user interface.

Computerized voice response systems are widely used to handle customer calls without requiring a human operator for each call. These systems comprise a host computer which a user accesses by dialing a predetermined number on a touch tone phone. The host computer then provides an audio listing of menu options over the user's phone while the user selects options by pressing pads on the phone keypad.

These voice response systems are generally disliked by users who may need to listen to an entire menu to determine the appropriate option. If the user becomes distracted at a pertinent place in the audio menu, the user may be required to listen to the entire menu again to determine the appropriate number to press on the phone keypad. The user cannot visually scan the possible menu options or review a menu after the distraction is removed, so while providing valuable information, the systems are not very user-friendly. Some system providers have distributed paper guides that enable a user to visually follow along with the audio listings, however these paper guides are easily lost and can become outdated.

Therefore, it would be desirable to provide a computerized voice response system which provides visual display of the menu options on a computer display screen so the user does not have to interface with only audio listings of menu options.

SUMMARY OF THE INVENTION

In accordance with the teachings of the present invention, a computerized voice response system is provided. The system includes a voice response host computer, a touch tone phone, a personal computer with a video display screen and a communications interface. The touch tone phone has a keypad. The personal computer has a program to display visual menus on the screen. Additionally, the personal computer may include a modem or may be connected to a LAN or other network. The communications interface converts dual tone multifrequency (DTMF) signals or other tones to digital signals to be used by user personal computer.

It is an important feature of the present invention that the user menus of a voice response system are presented visually as well as by audio listings.

It is also an important feature of the present invention that the voice response system which provides visual menu displays is still compatible with audio-only user interfaces.

It is accordingly an object of the present invention to provide a voice response system which, in addition to traditional audio menus, has menu options presented visually on a computer screen.

It is another object of the present invention to provide a voice response system which is compatible with systems providing both audio and visual user interfaces and systems providing only an audio user interface.

It is another object of the present invention to eliminate the bottleneck and cognitive mismatch associated with current exclusively audio voice response systems.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 6 is a flow chart of the general sequence of operations of a third embodiment of the present invention.

DETAILED DESCRIPTION OF THE PREFERRED EMBODIMENT

Figure 1:
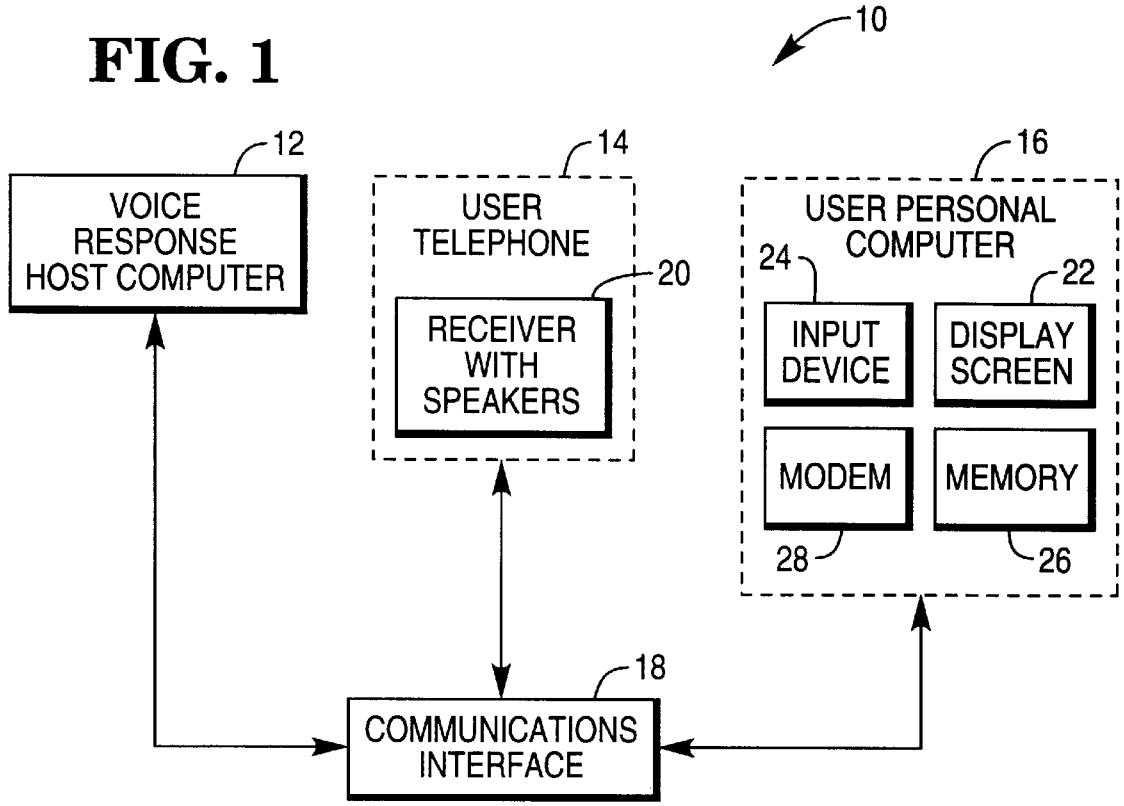
FIG. 1 is a block diagram of the voice response system of the present invention.

Referring now to the drawings, in which like-referenced characters indicate corresponding elements throughout the several views, attention is first drawn to FIG. 1 which shows a voice response system of the present invention. The software of the present invention works with the described hardware to provide the voice response system 10. Voice response system 10 includes voice response host computer 12, user telephone 14, user personal computer 16 and communications interface 18.

Voice response host computer 12 contains the necessary components to enable users to access the system, to monitor user input, and to provide pre-recorded audio information in response to user input.

User telephone 14 is a standard push-button, touch tone telephone, having a receiver with speakers 20.

User personal computer 16 is any standard personal computer and is not a dedicated terminal. User personal computer 16 contains video display screen 22, microprocessor, memory 26, user input device 24 and other standard components. User personal computer 16 has a program to display menu files visually on the computer display screen 22. User personal computer 16 may include a modem 28 or may be connected to a LAN or other network.

Communications interface 18 includes components and circuitry to detect and translate DTMF and other tones into digital tones to be used by the microprocessor in user computer 16. U.S. Pat. No. 5,325,427 issued Jun. 28, 1994 by Dighe, assigned to AT&T, is incorporated by reference to describe general detection of DTMF signals. Communications interface 18 may be connected to user personal computer 16 through a serial, parallel or keyboard port. Communications interface 18 may also be a built-in component of user personal computer 16. Communications interface 18 may also contain a DTMF generator to enable user computer 16 to send signals to voice response host computer 12.

Figure 2A:
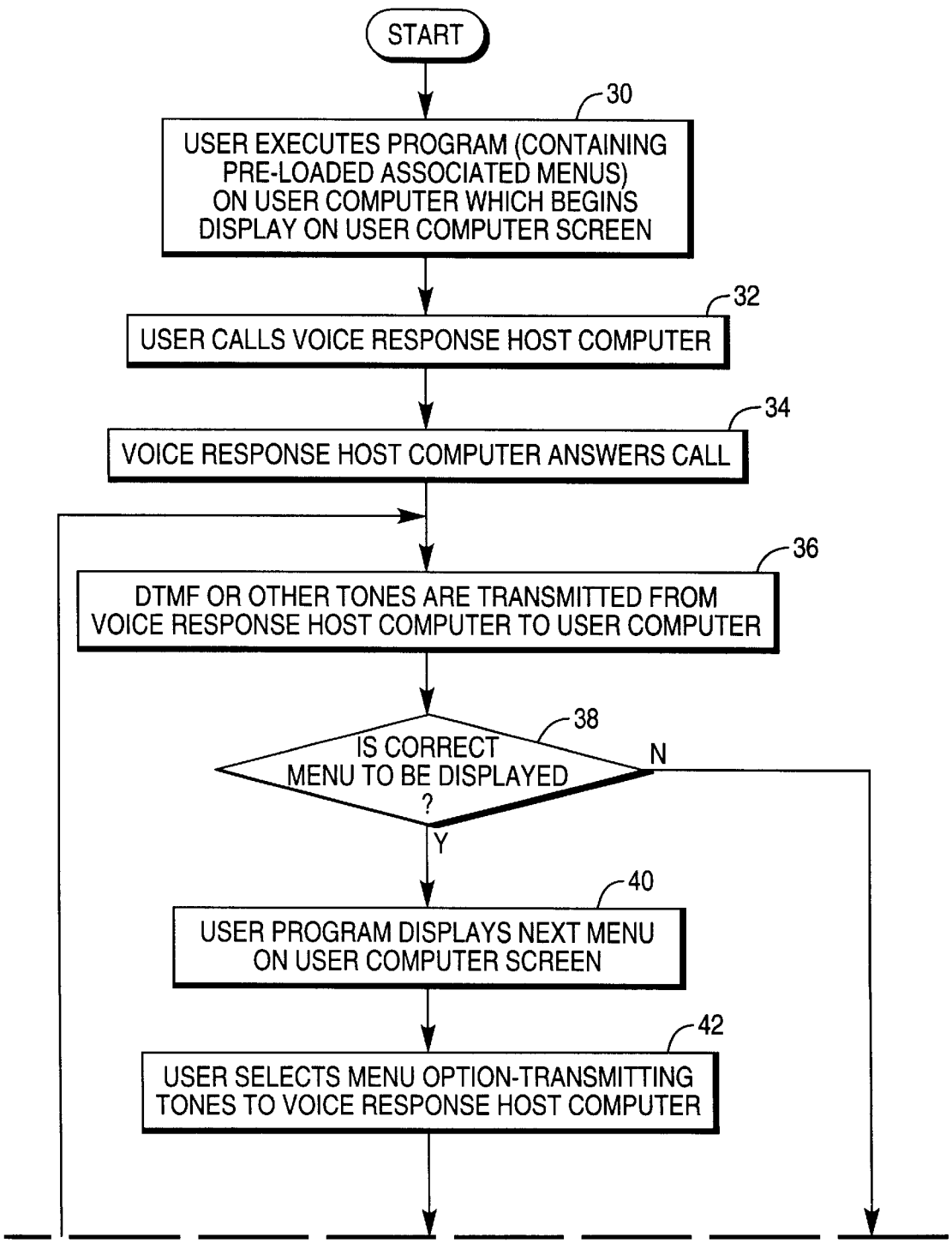
FIGS. 2A and 2B are a flow chart of the general sequence of operations of a first embodiment of the present invention.
Figure 2B:
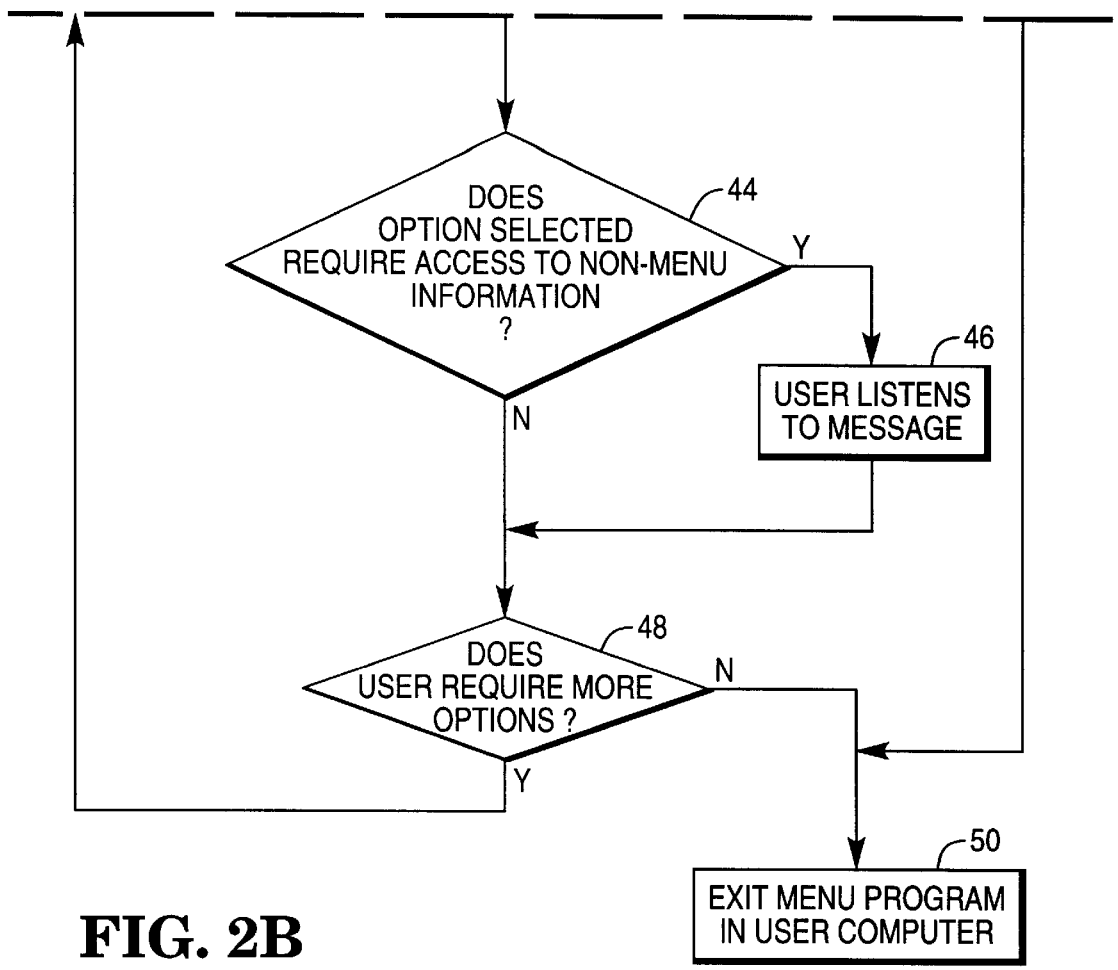

A general sequence of operations for providing a voice response system of the present invention will now be described in detail with reference to the operational flow chart of FIGS. 2A and 2B. In step 30, use of the voice response system of the present invention is initiated by executing, on user personal computer 16, a program in memory 26 associated with the desired transaction. The associated program contains menu files which could be provided by the service provider on a floppy disk or may be retrieved from a LAN system which user personal computer 16 is connected to. Additionally, user computer 16 may contain a modem 28 for downloading the program from a source computer before interaction with the voice response host computer 12 is begun.

After entering the desired menu files, the user, in step 32, dials a phone number to access the desired voice response host computer 12. The voice response host computer 12 answers the call in step 34. Continuing on to step 36, voice response host computer 12 transmits DTMF or other tones which user communications interface 18 detects and translates into digital codes for user personal computer 16. In step 38, user personal computer 16 compares the received digital codes with control words in the program to insure that the correct and up-to-date visual menu is displayed to correspond with the audio menu sent over the phone lines. (This prevents a user from inadvertently using an outdated version of the visual menus.) If the correct visual menu is not determined, then a message, for example "outdated software," will inform the user of the problem and the program will be exited. These tones also instruct the program to display and recite the next audio and visual menu in the sequence. In step 40, voice response host computer 12 provides audio listings of the menu options currently available while the user views the menu choices on user personal computer display screen 22.

Next, in step 42, user selects an audio or visual menu option by pressing a key on user telephone 14 keypad. This action causes DTMF or other tones to be transmitted to the voice response host computer 12. In step 44, it is determined if the user selection requires access to non-menu information, such as a recorded voice mail message. If so, in step 46, the user listens to the audio message as normal, through user telephone 14. Otherwise the program proceeds to step 48 and determines if user's selection requires more menu options. If user's selection indicates that no more menu options are required, then the program proceeds to step 50 and exits the program. User disconnects from voice response host computer 12 by hanging up user telephone 14, as normal. If more menu options are required, the program returns to step 36 and voice response host computer 12 sends appropriate DTMF or other tone signals to user computer 16. Thus a user interface with both audio and visual menus is provided.

Figure 3A:
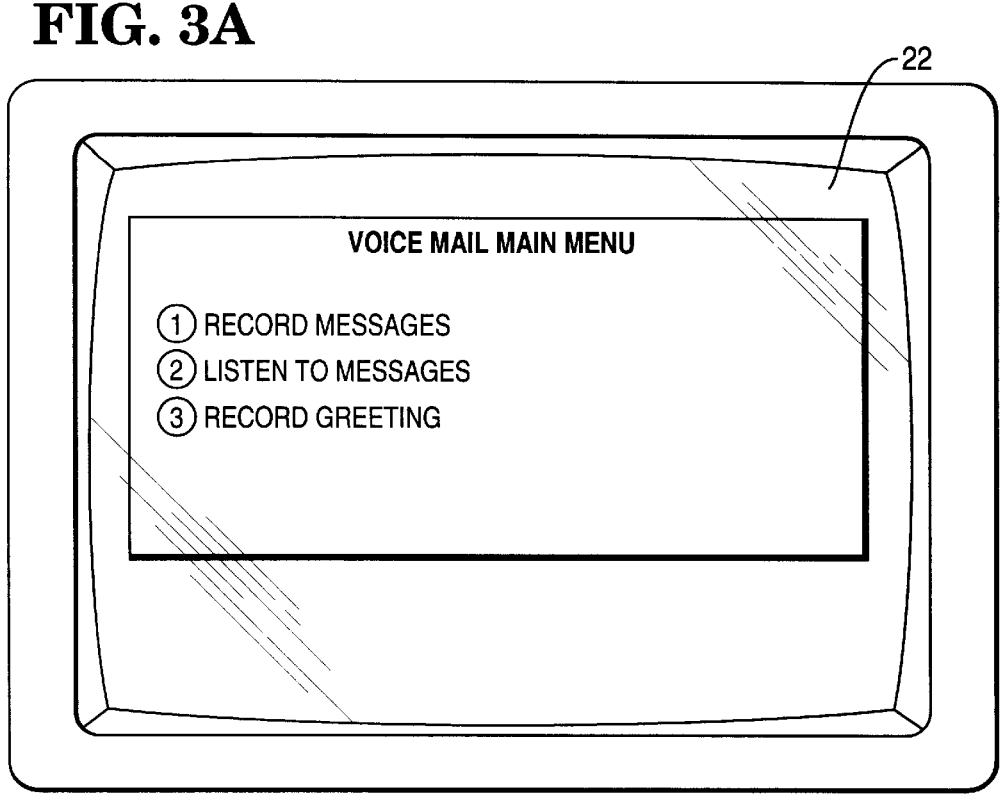
FIGS. 3A, 3B, 3C and 3D are diagrams of voice mail menus displayed visually on a computer display screen, along with audio menus, according to the present invention.
Figure 3B:
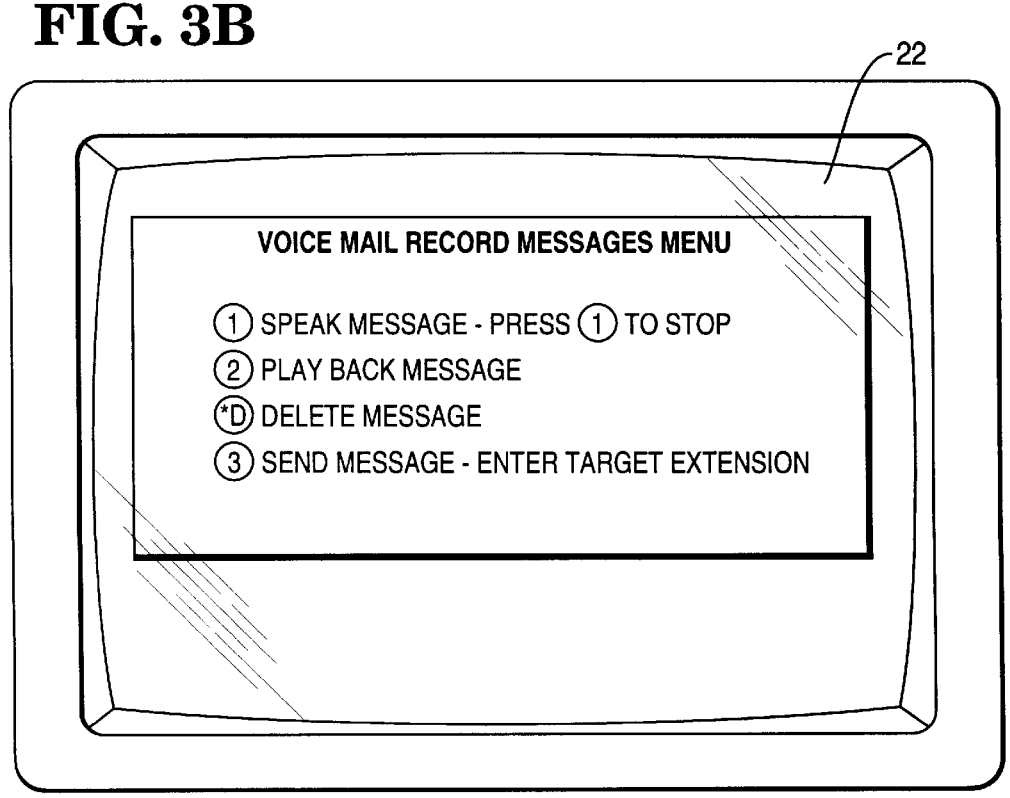
Figure 3C:
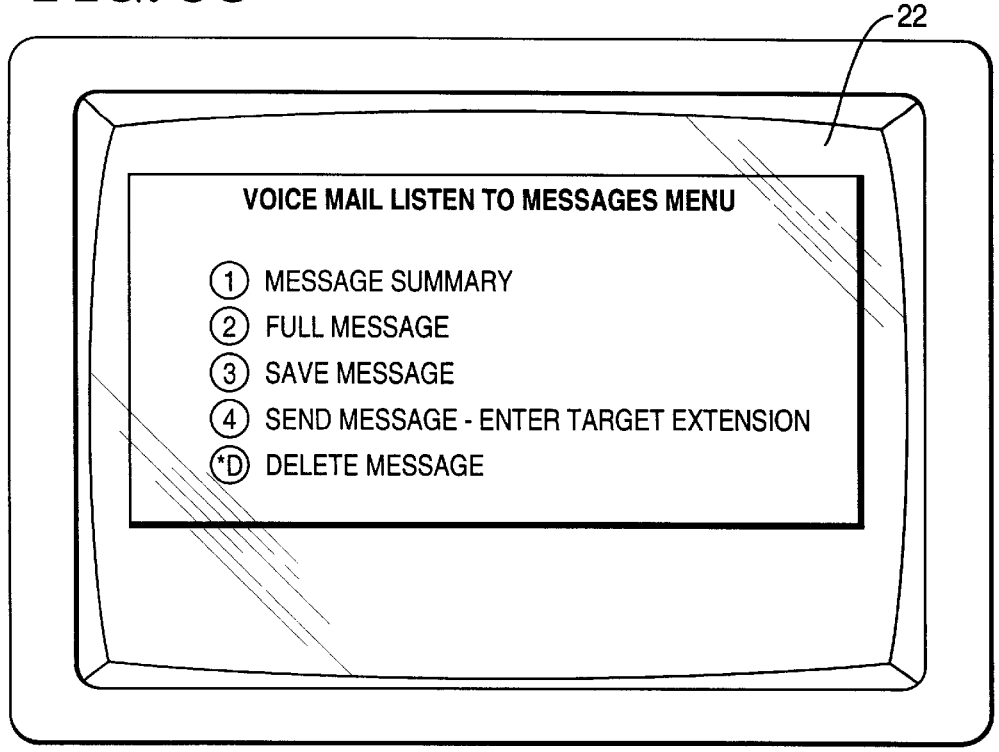
Figure 3D:
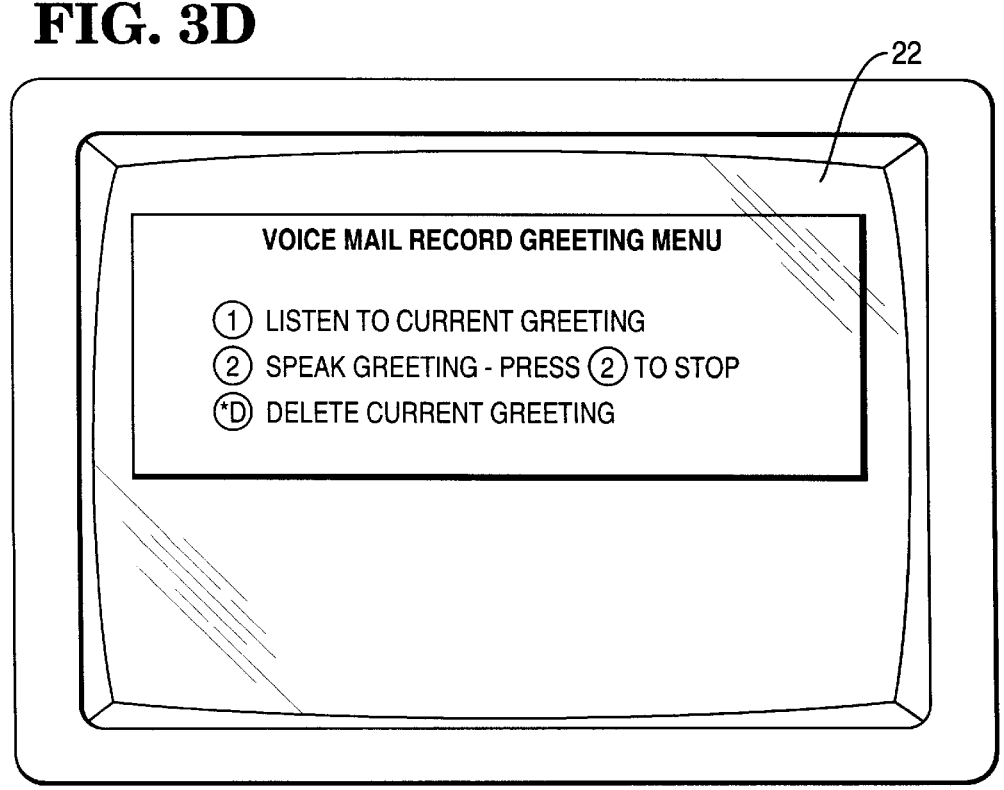
Figure 4A:
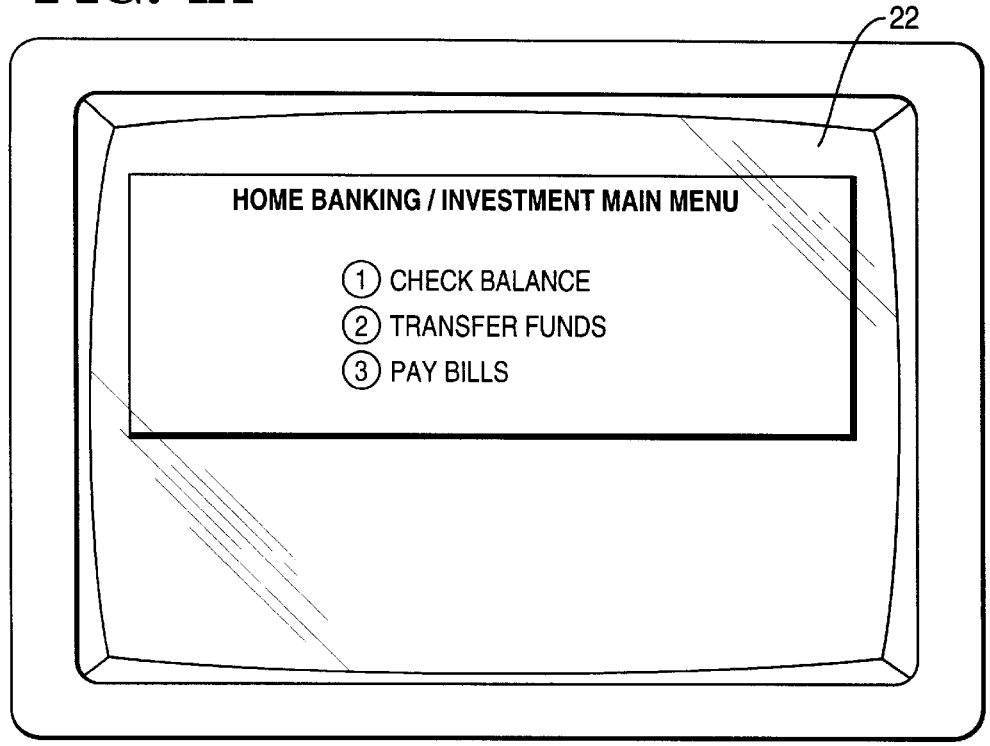
FIGS. 4A, 4B, 4C and 4D are diagrams of home banking or investment menus displayed visually on a computer display screen, along with audio menus, according to the present invention.
Figure 4B:
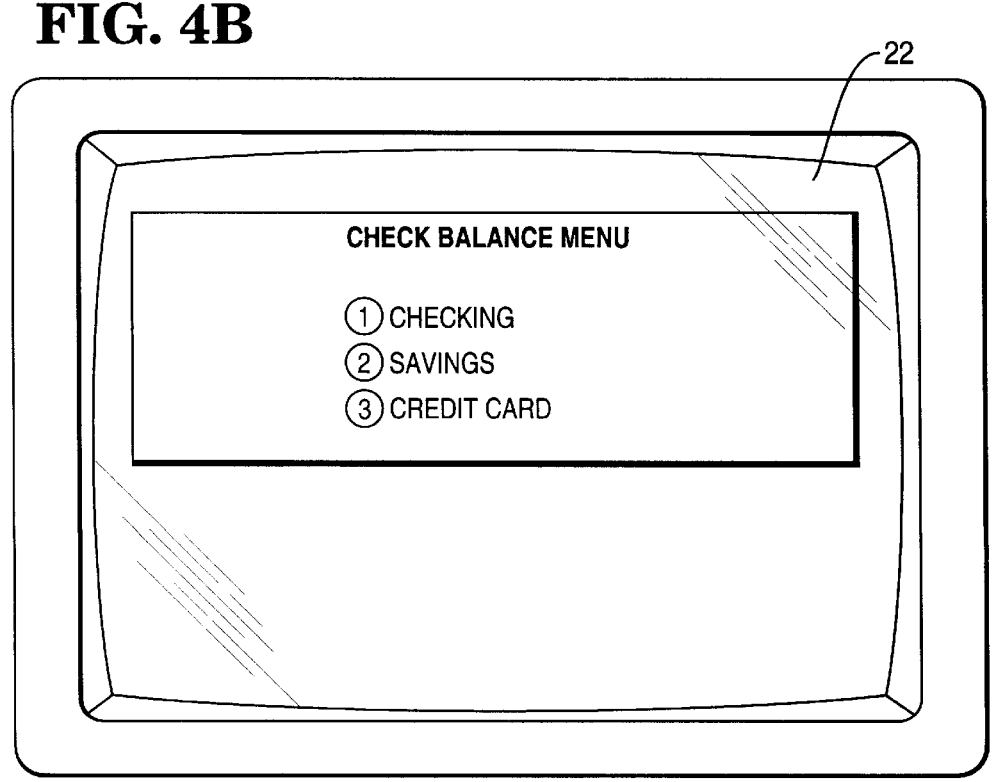
Figure 4C:
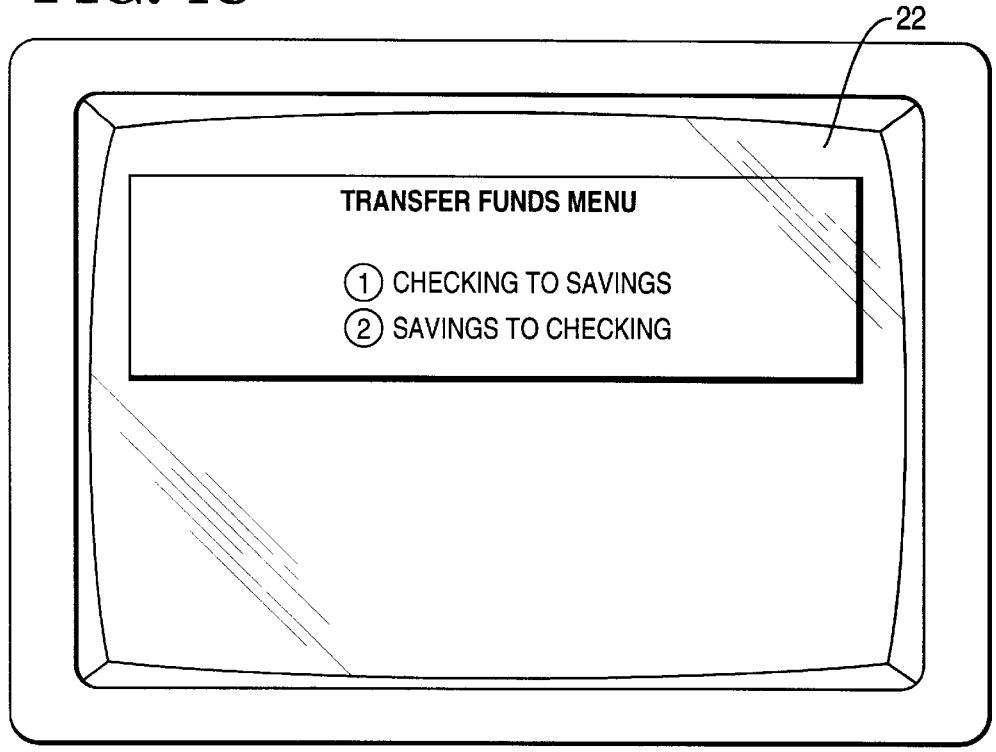
Figure 4D:
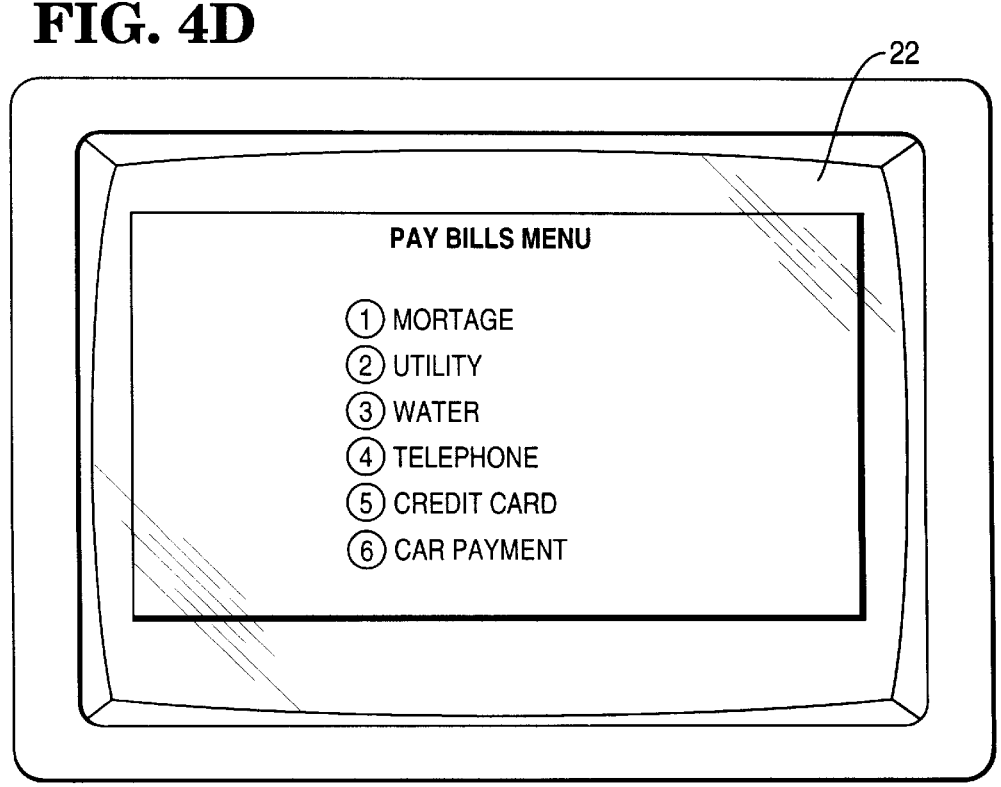
Figure 5A:
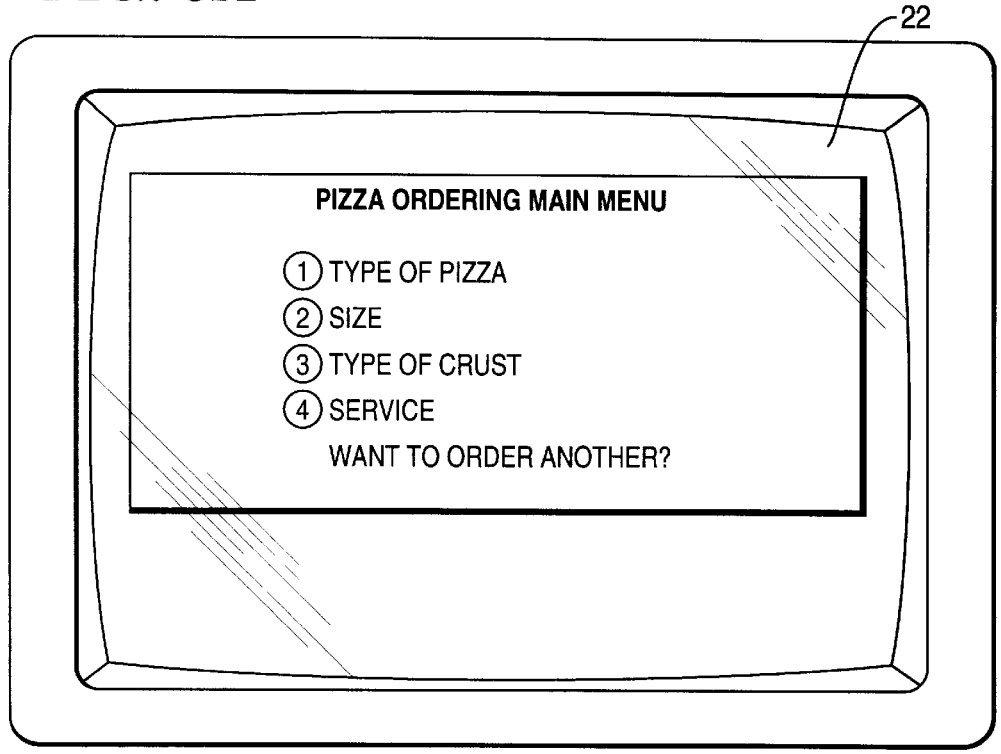
FIGS. 5A, 5B, 5C, 5D, 5E and 5F are diagrams of menus displayed visually on a computer display screen, along with audio menus, when a user calls a restaurant, such as a pizza parlor, to place an order.
Figure 5B:
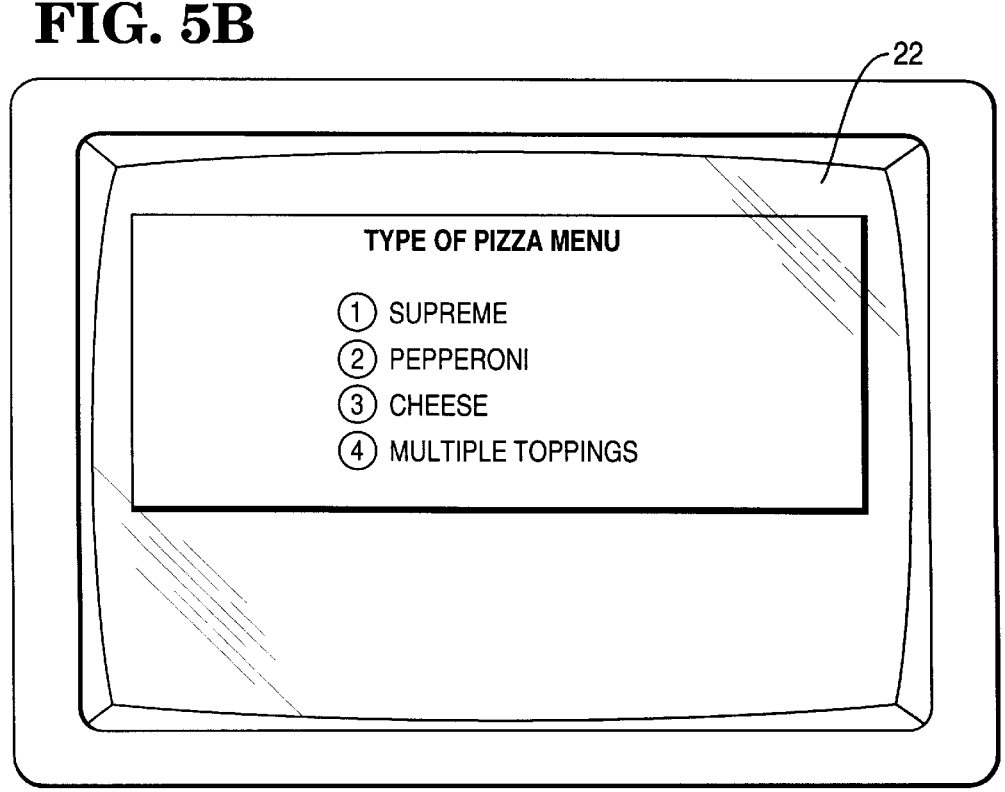
Figure 5C:
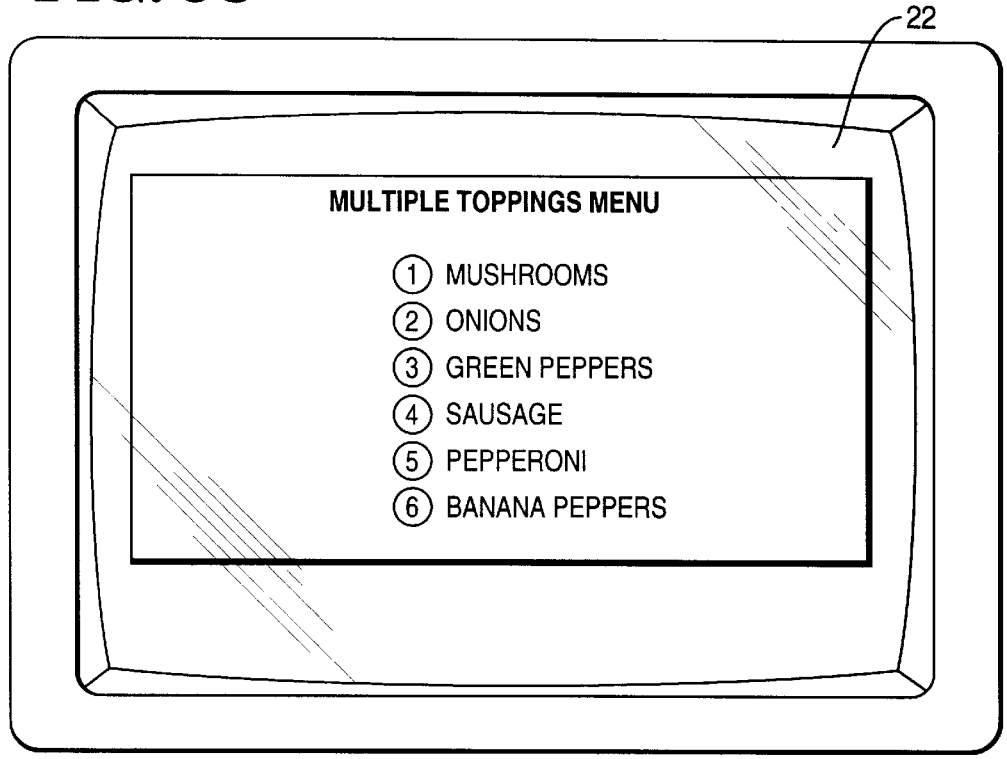
Figure 5D:
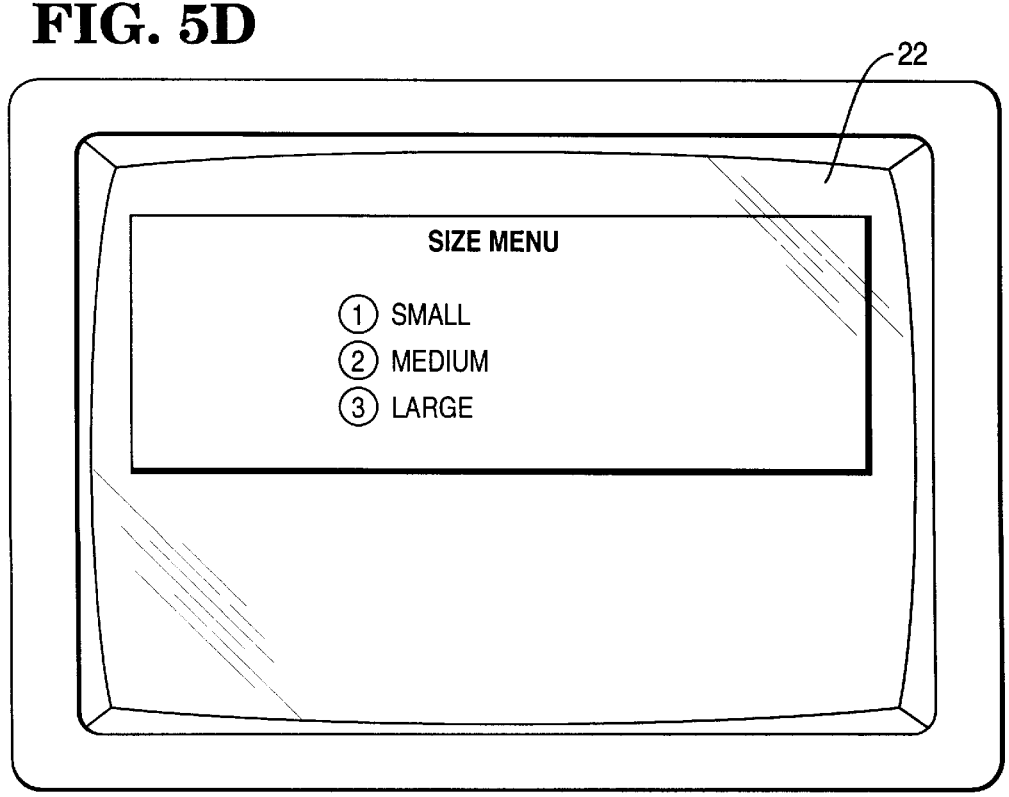
Figure 5E:
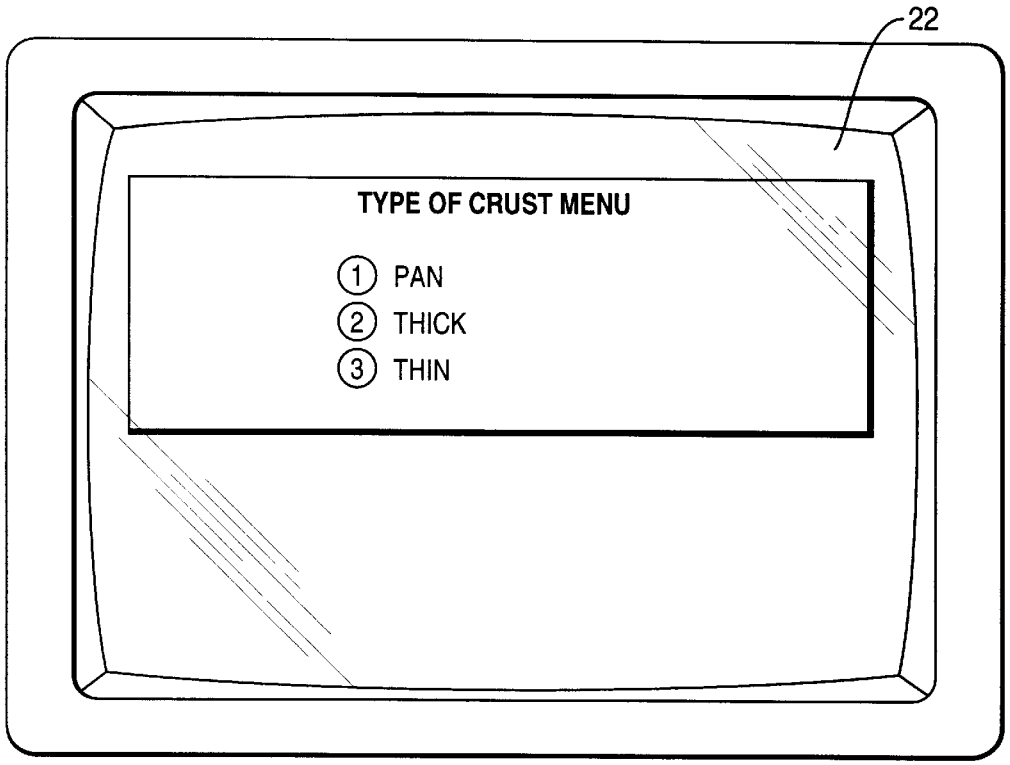
Figure 5F:
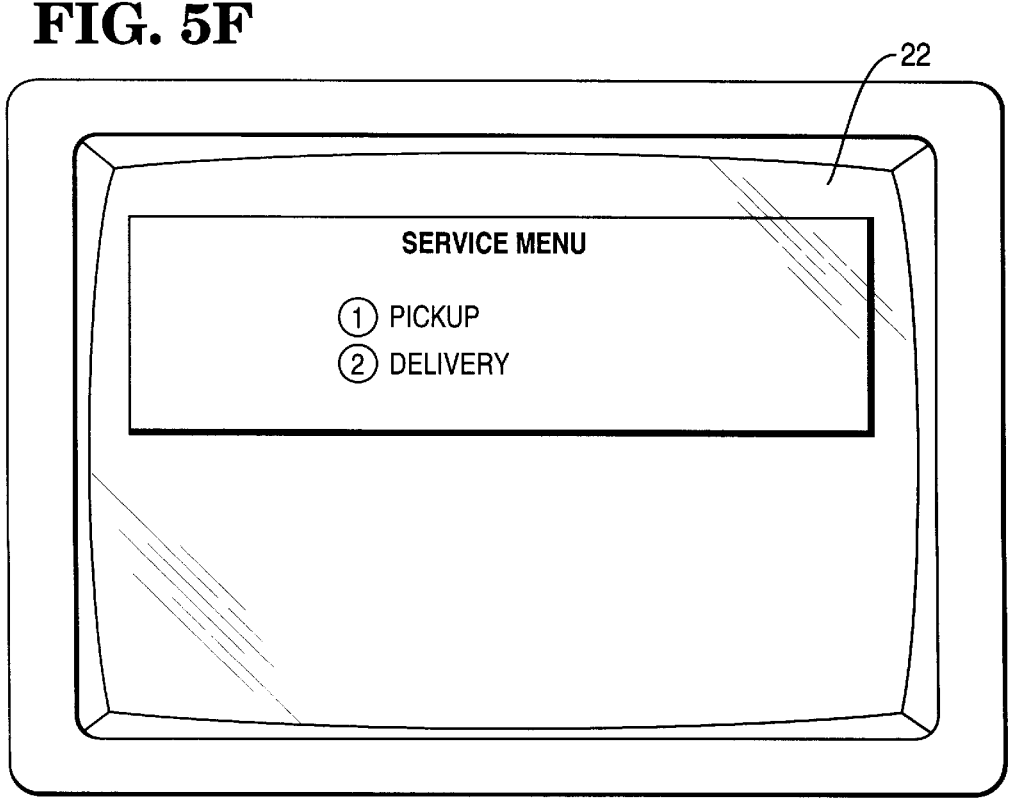

FIGS. 3A–3D, 4A–4D and 5A–5F show examples of visual menus on computer display screen 22, displayed according to the present invention. FIGS. 3A, 4A and 5A show examples of main menus. Corresponding to user selection at the main menu, menu 3B, 3C or 3D; 4B, 4C, or 4D; or 5B, 5D, 5E, or 5F may be displayed. Although only a few examples are shown, any audio voice response system can include visual menus, according to the present invention. Visual menus are particularly useful when the same menus must be accessed often, such as for user help lines.

FIGS. 3A–3D are voice mail menus displayed on user computer display screen 22 according to the present invention. The menus are quite complicated for a user to respond to, based on the audio listings. The present invention provides visual display of these menus along with the audio listings of the menu options. FIGS. 4A–4D are home banking or investment menus displayed on user computer display screen 22 according to the present invention. FIGS. 5A–5F are menus displayed on user computer display screen 22 according to the present invention when the user calls a restaurant, for example to place an order for a pizza.

In a second embodiment of the present invention, communications interface 18 contains a DTMF signal generator. When an associated program is executed, the program sends a signal to communications interface 18 indicating the telephone number to dial. Communications interface 18 then transmits a series of DTMF or other tones corresponding to the desired number. Using this embodiment, the user could also select responses from user computer input device 24, such as a keyboard or mouse, instead of telephone 14 keypad.

FIG. 6 shows the general sequence of operations for providing a voice response system in a third embodiment of the present invention in which the voice response host computer 12 remains unmodified. (The system works the same as described with respect to the first embodiment except voice response host computer 12 does not send additional DTMF or other tones.) In step 130, use of the voice response system of the present invention is initiated by executing, on user personal computer 16, a program associated with the desired transaction. The associated program contains visual menu files which could be provided by the means described in the discussion of the first embodiment.

After entering the desired menu files, the user, in step 132, dials a phone number to access the desired voice response host computer 12. The voice response host computer 12 answers the call in step 134. Continuing on to step 136, user program displays the first menu. Voice response host computer 12 provides audio listings of the menu options currently available while the user views the menu choices on user personal computer display screen 22.

Next, in step 142, user selects an audio or visual menu option by pressing a key on user telephone 14 keypad. This action causes DTMF or other tones to be transmitted to the voice response host computer 12. These tones cause the user program to advance to the next visual menu. (There is no check if the appropriate menu version is being displayed.) In step 144, it is determined if the user selection requires access to non-menu information, such as a recorded voice mail message. If so, in step 146, the user listens to the audio message as normal, through user telephone 14. Otherwise the program proceeds to step 148 and determines if user's selection requires more menu options. If user's selection indicates that no more menu options are required, then the program proceeds to step 150 and exits the program. User disconnects from voice response host computer 12 by hanging up user telephone 14, as normal. If more menu options are required, the program returns to step 142 and voice response host computer 12 sends appropriate DTMF or other tone signals. While this embodiment is advantageous in that voice response host computer 12 requires no modification, there is no check to determine whether the correct menu is being visually displayed. Therefore, if the user's software is outdated, confusion may occur, in that audio menus and visual menus are not consistent.

Advantageously, while being modified to provide video menus, the voice response system will also continue to provide audio listings for users without the video system. Although some embodiments of the present invention provide for additional tones to be transmitted, such tones are already heard on television broadcasts and are readily ignored and so would be ignored by users with an audio-only voice response interface.

Although the invention has been described with particular reference to certain preferred embodiments thereof, variations and modifications of the present invention can be effected within the spirit and scope of the following claims.

What is claimed is:

1. A computerized voice response system comprising:

a voice response host computer for providing audio menus;

a user telephone;

a user computer having a display screen and having a program to display visual menus on the user computer display screen and wherein said user computer is capable of operating independently and not in connection with said user telephone; and an interface for connecting the user telephone, the user computer and the voice response host computer, wherein said interface connects the user telephone to the voice response host computer, enabling sending signals from the user telephone to the voice response host computer, at all times the voice response host computer is connected for providing and receiving responses to audio menus and wherein the voice response host computer sends only audio messages and dual tone multifrequency signals or other audio tones to said interface which converts the dual tone multifrequency signals or other audio tones to digital signals for use by said user computer;

wherein the program in the user computer causes the user computer display screen to display visual menus along with the audio menus provided to the user telephone.

2. The system of claim 1 further including means for insuring that the displayed visual menus correspond to the audio menus provided.

3. The system of claim 1 wherein the user computer further includes a modem for receiving the program to display visual menus on the user computer display screen from a source computer.

4. The system of claim 1 wherein the program to display visual menus on the user computer display screen is stored on a floppy disk.

5. The system of claim 1 wherein the interface further includes a means for converting signals from the user computer into tones to be received by the voice response host computer, thereby enabling selection of menu items from an input device connected to the user computer.

6. A computerized voice mail voice response system comprising:

a voice response host computer for providing audio voice mail menus;

a user telephone;

a user computer having a display screen and having a program to display visual voice mail menus on the user computer display screen and wherein said user computer is capable of operating independently and not in connection with said user telephone; and an interface for connecting the user telephone, the user computer and the voice response host computer, wherein said interface connects the user telephone to the voice response host computer, enabling sending signals from the user telephone to the voice response host computer, at all times the voice response host computer is connected for providing and receiving responses to audio voice mail menus and wherein the voice response host computer sends only audio messages and dual tone multifrequency signals or other audio tones to said interface which converts the dual tone multifrequency signals or other audio tones to digital signals for use by said user computer;

wherein the program in the user computer causes the user computer display screen to display visual voice mail menus along with the audio voice mail menus provided to the user telephone.

7. The system of claim 6, further including means for insuring that the displayed visual voice mail menus correspond to the audio voice mail menus provided.

8. A computerized voice response system for providing restaurant ordering comprising:

a voice response host computer for providing audio restaurant ordering menus;

a user telephone;

a user computer having a display screen and having a program to display visual restaurant ordering menus on the user computer display screen and wherein said user computer is capable of operating independently and not in connection with said user telephone; and an interface for connecting the user telephone, the user computer and the voice response host computer, wherein said interface connects the user telephone to the voice response host computer, enabling sending signals from the user telephone to the voice response host computer, at all times the voice response host computer is connected for providing and receiving responses to audio restaurant ordering menus and wherein the voice response host computer sends only audio messages and dual tone multifrequency signals or other audio tones to said interface which converts the dual tone multifrequency signals or other audio tones to digital signals for use by said user computer;

wherein the program in the user computer causes the user computer display screen to display visual restaurant ordering menus along with the audio restaurant ordering menus provided to the user telephone.

9. The system of claim 8, further including means for insuring that the displayed visual restaurant ordering menus correspond to the audio restaurant ordering menus provided.

10. A computerized home banking voice response system comprising:

a voice response host computer for providing audio home banking menus;

a user telephone;

a user computer having a display screen and having a program to display visual home banking menus on the user computer display screen and wherein said user computer is capable of operating independently and not in connection with said user telephone; and an interface for connecting the user telephone, the user computer and the voice response host computer, wherein said interface connects the user telephone to the voice response host computer, enabling sending signals from the user telephone to the voice response host computer, at all times the voice response host computer is connected for providing and receiving responses to audio home banking menus and wherein the voice response host computer sends only audio messages and dual tone multifrequency signals or other audio tones to said interface which converts the dual tone multifrequency signals or other audio tones to digital signals for use by said user computer;

wherein the program in the user computer causes the user computer display screen to display visual home banking menus along with the audio home banking menus provided to the user telephone.

11. The system of claim 10 further including means for insuring that the displayed visual home banking menus correspond to the audio home banking menus provided.

12. A method for completing a telephone transaction using a computerized voice response system, the method comprising the steps of:

provide a voice response host computer;

providing a user telephone;

providing a user computer having a display screen wherein said user computer is capable of operating independently and not in connection with said user telephone;

executing a program in the user computer for displaying visual menus on a user computer display screen;

connecting the voice response host computer, the user telephone and the user computer through an interface;

transmitting tones from the voice response host computer to the user telephone to provide audio menus;

displaying visual menus on the user computer display screen along with the audio menus;

selecting menu items, thereby transmitting tones to the voice response host computer, wherein the interface connects the user telephone to the voice response host computer, enabling sending signals from the user telephone to the voice response host computer, at all times the voice response host computer is connected for providing and receiving responses to audio menus and wherein the voice response host computer sends only audio messages and dual tone multifrequency signals or other audio tones to said interface which converts the dual tone multifrequency signals or other audio tones to digital signals for use by said user computer; and exiting the program on the user computer when the transaction is complete.

13. The method of claim 12 further comprising the step of transmitting tones from the voice response host computer to the user computer to insure that the user program is a correct version.

14. The method of claim 13 wherein the step of selecting menu items further includes the steps of:

using an input device connected to the user computer to select menu items; and converting a signal from the user computer into tones to be received by the voice response host computer, thereby enabling selection of menu items from the input device connected to the user computer.

15. A method for completing a transaction with a voice mail system comprising:

providing a voice response host computer;

providing a user telephone;

providing a user computer having a display screen wherein said user computer is capable of operating independently and not in connection with said user telephone;

executing a program in the user computer for displaying visual voice mail menus on a user computer display screen;

connecting the voice response host computer, the user telephone and the user computer through an interface;

providing audio voice mail menus from the host computer over the user telephone;

displaying visual voice mail menus on the user computer display screen along with the audio menus;

selecting menu items, thereby transmitting tones to the voice response host computer indicating the next audio menu to be listed and to the user computer indicating the next visual menu to be displayed, wherein the interface connects the user telephone to the voice response host computer, enabling sending signals from the user telephone to the voice response host computer, at all times the voice response host computer is connected for providing and receiving responses to audio menus and wherein the voice response host computer sends only audio messages and dual tone multifrequency signals or other audio tones to said interface which converts the dual tone multifrequency signals or other audio tones to digital signals for use by said user computer; and exiting the program on the user computer when the transaction is complete.

16. The method of claim 15 wherein the step of providing audio menus from the host computer further includes sending tones to insure the correct visual menu is being displayed.

17. A method for completing a transaction with a restaurant ordering system comprising:

providing a voice response host computer;

providing a user telephone;

providing a user computer having a display screen wherein said user computer is capable of operating independently and not in connection with said user telephone;

executing a program in the user computer for displaying visual restaurant ordering menus on a user computer display screen;

connecting the voice response host computer, the user telephone and the user computer through an interface;

providing audio restaurant ordering menus from the host computer over the user telephone;

displaying visual restaurant ordering menus on the user computer display screen along with the audio restaurant ordering menus;

selecting restaurant menu items, thereby transmitting tones to the voice response host computer indicating the next audio restaurant ordering menu to be listed and to the user computer indicating the next visual restaurant ordering menu to be displayed, wherein the interface connects the user telephone to the voice response host computer, enabling sending signals from the user telephone to the voice response host computer, at all times the voice response host computer is connected for providing and receiving responses to audio menus and wherein the voice response host computer sends only audio messages and dual tone multifrequency signals or other audio tones to said interface which converts the dual tone multifrequency signals or other audio tones to digital signals for use by said user computer; and exiting the restaurant ordering menu program on the user computer when the transaction is complete.

18. The method of claim 17 wherein the step of providing audio menus from the host computer further includes sending tones to insure the correct visual restaurant ordering menu is being displayed.

19. A method for completing a transaction with a home banking system comprising:

providing a voice response host computer;

providing a user telephone;

providing a user computer having a display screen wherein said user computer is capable of operating independently and not in connection with said user telephone;

executing a program in the user computer for displaying visual home banking menus on a user computer display screen;

connecting the voice response host computer, the user telephone and the user computer through an interface;

providing audio home banking menus from the host computer over the user telephone;

displaying visual home banking menus on the user computer display screen along with the audio home banking menus;

selecting home banking menu items, thereby transmitting tones to the voice response host computer indicating the next audio home banking menu to be listed and to the user computer indicating the next visual home banking menu to be displayed, wherein the interface connects the user telephone to the voice response host computer, enabling sending signals from the user telephone to the voice response host computer, at all times the voice response host computer is connected for providing and receiving responses to audio menus and wherein the voice response host computer sends only audio messages and dual tone multifrequency signals or other audio tones to said interface which converts the dual tone multifrequency signals or other audio tones to digital signals for use by said user computer; and exiting the program on the user computer when the transaction is complete.

20. The method of claim 19 wherein the step of providing audio home banking menus from the host computer further includes sending tones to insure the correct visual home banking menu is being displayed.

* * * * *